(12) United States Patent
Bergquist et al.

(10) Patent No.: US 10,276,300 B2
(45) Date of Patent: Apr. 30, 2019

(54) COMBINED COMMON MODE INDUCTOR AND DIFFERENTIAL SIGNAL TRANSFORMER

(71) Applicant: ABB Schweiz AG, Baden (CH)

(72) Inventors: Gustav Bergquist, Stockholm (SE); Tomas Modeer, Stockholm (SE); Joakim Asplund, Stockholm (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/777,549

(22) PCT Filed: Nov. 11, 2016

(86) PCT No.: PCT/SE2016/051114
§ 371 (c)(1),
(2) Date: May 18, 2018

(87) PCT Pub. No.: WO2017/086863
PCT Pub. Date: May 26, 2017

(65) Prior Publication Data
US 2018/0366261 A1    Dec. 20, 2018

(30) Foreign Application Priority Data

Nov. 18, 2015 (SE) ...................................... 1551493

(51) Int. Cl.
*H01F 27/33* (2006.01)
*H02M 7/00* (2006.01)
(Continued)

(52) U.S. Cl.
CPC ............. *H01F 27/33* (2013.01); *H01F 17/04* (2013.01); *H01F 27/28* (2013.01); *H02M 7/003* (2013.01);
(Continued)

(58) Field of Classification Search
CPC ..... H02M 2001/123; H02M 1/12; G05F 1/33; H02J 3/01
(Continued)

(56) References Cited

U.S. PATENT DOCUMENTS 6,404,179 B1 *  6/2002  Sugiura .................. H04B 15/02
                                                        323/301
6,898,092 B2   5/2005  Briere et al.
(Continued)

FOREIGN PATENT DOCUMENTS

EP          2572942 A1    3/2013
EP          2808990 A1    12/2014
(Continued)

OTHER PUBLICATIONS

International Search Report and Written Opinion for International Application No. PCT/SE2016/051114, dated Feb. 8, 2017, 8 pages.

*Primary Examiner* — Gary A Nash
(74) *Attorney, Agent, or Firm* — Brake Hughes Bellermann LLP (57) ABSTRACT

A common mode inductor (10) for suppression of common mode noise and transmission of a differential signal is disclosed. The inductor comprises a core (15) with a first and second winding (11, 12), wherein the first winding and the second winding forms a pair of conductors arranged to convey a differential communication signal. Further, a third and fourth winding (13, 14) is arranged to extend along at least a portion of the first and second winding, respectively. The third winding and the fourth winding may be locally inductively coupled to the first winding and the second winding, respectively. Moreover, the third winding and the fourth winding are connected in series with each other so that differential signal on the first and second windings transformed to the third and fourth winding maybe added to each other. The third and fourth winding may hence provide (Continued)

a sensor signal induced by the differential communication signal in the first winding and the second winding. A system (100) comprising the common mode inductor and a method for measuring a differential signal in said inductor is also disclosed.

16 Claims, 3 Drawing Sheets

(51) Int. Cl.
    *H01F 17/04*     (2006.01)
    *H01F 27/28*     (2006.01)
    *H02M 7/5387*     (2007.01)
    *H01F 17/00*     (2006.01)
    *H02M 1/12*     (2006.01)
    *H02J 3/01*     (2006.01)
    *G05F 1/33*     (2006.01)

(52) U.S. Cl.
    CPC .............. *H02M 7/5387* (2013.01); *G05F 1/33* (2013.01); *H01F 2017/0093* (2013.01); *H02J 3/01* (2013.01); *H02M 1/12* (2013.01); *H02M 2001/123* (2013.01)

(58) Field of Classification Search
    USPC .............................. 323/206, 362; 363/39, 64
    See application file for complete search history.

(56) References Cited

U.S. PATENT DOCUMENTS

| | | |
|---|---|---|
| 2008/0080106 A1 | 4/2008 | Mirafzal et al. |
| 2011/0153234 A1* | 6/2011 | Winterhalter .......... H02H 3/332 |
| | | 702/58 |
| 2014/0306788 A1* | 10/2014 | Umetani ............... H01F 27/385 |
| | | 336/173 |

FOREIGN PATENT DOCUMENTS

| | | |
|---|---|---|
| WO | 2013/030236 A2 | 3/2013 |
| WO | 2014/131734 A1 | 9/2014 |

* cited by examiner

COMBINED COMMON MODE INDUCTOR AND DIFFERENTIAL SIGNAL TRANSFORMER

CROSS REFERENCE TO RELATED APPLICATION

This application is a 35 U.S.C. § 371 National Phase Entry Application from PCT/SE2016/051114, filed on Nov. 11, 2016, and designating the U.S., which claims priority under 35 U.S.C. § 119 to Swedish Patent Application No. 1551493-8, filed on Nov. 18, 2015, the disclosures of which are incorporated herein in their entireties by reference.

TECHNICAL FIELD

The invention disclosed herein relates to communication in electrical systems, and in particular to a common mode inductor for transmitting or receiving of a differential mode signal and at the same time suppression of common mode noise.

BACKGROUND

Transfer of signals, such as e.g. communication signals, is of interest in connection with electrical systems. The signals may carry information relating to control and operation of different components of the system, and may in particular be used for delivering information relating to measured operational parameters and instructions controlling or optimising the performance of the system. In for example power conversion systems, fast and efficient conveyance of information relating to input power, performance of the power converter(s), output power and/or operational instructions are desired in order to achieve an efficient operation of the system. Further, suppression of common mode may noise may also be of interest in such systems, as common mode currents and/or voltages may disturb both the system itself as well as other systems in the surroundings, and may be transferred long distances through e.g. the power grid.

Part of this issue has been addressed in e.g. WO2014/131734 and PCT/EP2012/066782, wherein control signals between a central adaptation unit and a plurality of switching units of a power inverter system are transferred by means of a wireless or common line communication channel.

Although there are methods well known for such a communication channels to be implemented, there is still a need for alternative and improved methods for transferring information in connection with such power inverter systems in a cost and energy efficient way.

SUMMARY

An object of at least some of the embodiments of the present invention is to provide an improved alternative to the above described technique.

Accordingly, the invention provides a common mode inductor, a system and a method with the features of the independent claims. The dependent claims define advantageous embodiments.

In a first aspect, a common mode inductor for suppression of common mode noise and transmission of a differential signal is provided. The inductor comprises a core with a first winding and a second winding, wherein the first winding and the second winding forms a pair of conductors arranged to convey a differential communication signal. Further, a third winding is arranged to extend along at least a portion of the first winding and a fourth winding is arranged to extend along at least a portion of the second winding. The third winding and the fourth winding may be locally inductively coupled to the first winding and the second winding, respectively. Moreover, the third winding and the fourth winding are connected in series with each other so that differential signal on the first and second windings transformed to the third and fourth winding may be added to each other (i.e., amplified). The third and fourth winding may hence be adapted to provide a sensor signal induced by the differential communication signal in the first winding and the second winding.

According to a second aspect, a system is provided. The system comprises a switching unit adapted to receive an input power and to output an output voltage waveform and an alternating current, and a common mode inductor according to the first aspect. The output voltage is a differential signal that hence may be conveyed by the inductor.

According to a third aspect, a method for measuring a differential communication signal, which may have a substantially higher frequency than the output AC signal, in a common mode inductor according to the first aspect is provided. The method comprises transmitting a differential communication signal through the first winding and the second winding, and measuring the differential communication signal that is transformed to the third and fourth winding.

A common mode signal may be understood as a signal having the same sign in both the first winding and the second winding. The fields generated by such a signal may add in the core the inductor which consequently may act as a high impedance component blocking or attenuating the signal. Reversely, a differential signal, which could be understood as a signal with different signs in the first winding and the second winding, the fields may to a large extend cancel each other. The inductor may therefore act as a low impedance component letting the signal pass.

Although the first and second windings may be arranged so that differential signals may generate mutually cancelling or attenuating fields in the core, the third and fourth windings may be inductively coupled to the first and second windings, respectively, so as to provide a transforming effect.

The present aspects make use of an understanding that the third and fourth windings can be used to form a sensor winding for measuring the differential signal transmitted through the inductor. This is particularly advantageous in systems already comprising a common mode inductor, as that component may be complemented or upgraded to a combined sensor device by means of the additional third and fourth wiring. Hence, a sensor or measurement functionality may be provided without further addition of separate sensing or measuring devices. Further, this allows for a signal transmitted in a common (power) line to be measured, which may eliminate the need for separate communication channels and additional cabling or wireless communication means. Further, by using existing components there is no need for additional sensing stages or receivers for receiving the signal. Instead, the existing equipment of the electric system may be used for the additional purpose of communication, which allows for a reduced bill of material, size and cost related to e.g. manufacturing and maintenance.

As already mentioned, a common mode inductor (also referred to as a common mode choke or common mode choke coil or coils) may, in the context of the present application, refer to an electric component acting as an inductor against common mode currents but not for differential mode currents. The common mode inductor may hence be used for filtering purposes in differential signalling or power transmission, wherein the filtering effect may be desired primarily in connection with the common mode. The conductor may comprise two coils forming a pair of differential conductors wound in opposite directions on a magnetic core. The windings may be configured in such manner that magnetic fields produced by differential mode currents in the windings tend to cancel each other out whereas magnetic fields from common mode currents in the windings tends to add together, thereby providing an impedance that suppresses common mode noise.

By arranging the sensor winding, i.e., the third and fourth windings, along at least a part of the first and second winding an electromagnetic interaction may be achieved between the first and/or second winding and the sensor winding. Due to the electromagnetic interaction, a sensor signal may be induced in the sensor winding as the differential signal or electric power flows through the inductor. The series connection of the third and fourth winding allows for currents to be induced in the same direction in the third and the fourth winding in the differential mode. Conversely, currents may be induced in different directions in the common mode such that currents induced in the third winding may oppose or cancel out currents induced in the fourth winding. The currents induced during differential mode operation may hence add up to a sensor signal that can be extracted from the sensor winding and be used as a measure of the differential signal flowing through the common mode inductor in the differential mode.

The sensor signal may correspond to the differential signal and may hence be used for determining or measuring the differential signal. The present aspects thereby allow for common mode noise to be suppressed while the differential mode signal may be transformed even for relatively low differential mode content.

The differential signal may e.g. comprise information relating to voltages or currents in the system, and other parameters relating to e.g. temperature, capability and performance of the electric system.

According to an embodiment, the core of the common mode inductor may be ferromagnetic and/or ring-shaped, C-shaped or E-shaped.

According to an embodiment, the first winding and the second winding may be adapted to convey a differential output AC from a switching unit connected to an input power source, such as a DC source. The differential mode power may be transferred in a common line together with the differential mode communication signal and hence be measured by the sensor winding of the inductor. The differential communication signal may e.g. be conveyed as a superimposed signal on the differential output AC. Further, the differential communication signal may comprise instructions for operating the switching unit. The present embodiment is advantageous in the switching unit as it may output AC and receive information, such as e.g. the operational instructions, via the same line. No additional communication channel for the differential signal is needed. At the same time, common mode signals may be blocked or attenuated by the inductor.

According to an embodiment, the switching unit may form part of a power inverter system comprising a plurality of switching units that are electrically connected to each other in cascade configuration. Each one of the switching units may be adapted to receive a respective input power from e.g. a photovoltaic panel. Further, each of the switching units may be individually controlled so as to produce a combined output AC that is output to a common line. The switching units may be operated in response to a command signal that may be transmitted via the differential signal and received by means of the sensor winding of the common mode inductor.

The individual control of the switching units is particularly relevant for applications and systems wherein the respective input power varies over time and/or is difficult to predict. This may be the case in e.g. photovoltaic elements or solar panels, wherein the output power may be determined by a non-linear relationship between voltage and current. Events like a passing shadow, or differences in panel performance due to pollution, differential aging or differences during manufacturing may hinder an array of panels as a whole to operate at its peak efficiency point. The present aspects provide a solution wherein each panel may be connected to a respective switching unit that can be individually operated in response to a differential signal measured by the common mode inductor at each switching unit. The operation of the switching unit may hence be adapted to specific requirements during operation.

According to an embodiment, the power inverter system may be connected to a central unit adapted to generate the command signal for controlling the operation of at least some of the switching units. The central unit may be adapted to receive information indicating a current state of one or several of the switching units, a measure indicating an input voltage or current, generated output voltage or current or further information relating to e.g. a desired output AC, temperature or performance of a photovoltaic panel connected to the power inverter system. The central unit may be configured to generate the command signal, which is transmitted via the common line to the switching units where it may be determined by means of the common mode inductor. The switching operations of the power inverter system may hence be based on the received information or parameters carried by the command signal.

In some examples, the command signal may comprise a state command causing a switching unit to output or receive power, and preferably to output a voltage at a certain level (positive, zero, negative or voltages there between). Additionally, or alternatively, the state command may cause the switching unit to cease outputting power or voltage. The command signal may also comprise further or alternative commands causing the switching units to output any combination of two or more of a positive voltage, a negative voltage, zero voltage and voltages there between.

According to an embodiment, the switching unit is an H-bridge converter. The H-bridge converter may e.g. comprise four metal oxide semiconductor field effect transistors (MOSFETs) or any other type of semiconductor switch or transistor. The switching unit may also be formed of e.g. a half bridge converter. It will however be appreciated that the term "switching unit" may, in the context of the present application, refer to any electric component capable of receiving input DC power and producing a multilevel output of two or more different voltage/current levels.

According to an embodiment, the switching units may be operable in an inverter mode in which they are individually switched in response to switching commands of the command signal so as to produce the combined output voltage waveform transferred on the common line, and in a communication mode in which the switching units are switched between two consecutive switching commands so as to produce a communication signal transmitted on the common line. At least one of the switching units may be operated in the communication mode while the remaining switching units are maintained in their present state, i.e., while the remaining switching units are not switched. The present embodiment is advantageous in that the silent periods of the output voltage waveform, i.e., the periods in time located between two mutually adjacent switching evens of the switching units and where the voltage of the multilevel output voltage waveform is relatively constant and has a relatively low harmonic content, may be utilized for transmitting a superimposed communication signal on the combined output voltage waveform. The communication signal may be provided by switching one or several of the switching units while letting the remaining switching units be "silent", i.e., remain in a non-switching present state. The switching units may, in other words, be considered to operate in two different modes—the inverter mode generating the combined multistage output voltage waveform and the communication mode generating the communication signal. In the inverter mode each or at least some of the switching units may be switched based on switching commands of the command signal so as to form a desired multistage output voltage waveform. The period defined by two mutually adjacent switching commands may be referred to as a silent period of the multistage output voltage waveform, as the output may be relatively low in terms of unwanted harmonics during this period. In other words, the output voltage waveform may during this silent period have a relatively low noise, which is particularly advantageous in connection with signaling as a relatively low level of noise may reduce the need for filtering and amplification of the communication signal. In this silent period, one or several of the switching units may be operated in the communication mode, in which they may be switched a plurality of times to generate a superimposed communication signal.

It will be appreciated that the central unit may comprise a switching unit adapted to operate and generate a command signal in a similar way as described above, i.e., using silent periods to transmit the signal.

According to an embodiment, the common mode inductor may be provided at a central unit and arranged to receive, via the common line, the communication signal generated at the switching unit(s). The communication signal may represent at least one of frequency, phase, amplitude and harmonics of a required voltage waveform, such as e.g. a grid voltage waveform. The information may be processed by a processor adapted to calculate a command signal based on the received communication signal. The calculated command signal may then be output via the common line and transferred to the switching units, which may be individually controlled accordingly such that the combined output from the plurality of switching units produce a voltage waveform matching the required voltage waveform.

In context of the present application, the terms "output voltage waveform", "output voltage", "output power", "AC", "alternating current" and "alternating voltage" may be interchangeably used. The electrical power that is output from the power inverter system or a switching unit may be understood as an alternating voltage driving an alternating current.

It will also be appreciated that the present aspects may be implemented in, or realized as a high-power transmission system.

The present aspects may be embodied as computer-readable instructions for controlling a programmable computer in such manner that it performs the method outlined above. Such instructions may be distributed in the form of a computer-program product comprising a computer-readable medium storing the instructions. In particular, the instructions may be loaded in a microcontroller of the central unit.

Further objectives of, features of and advantages with the present aspects will become apparent when studying the following detailed disclosure, the drawings and the appended claims. Those skilled in the art realise that different features of the present aspects, even if recited in different claims, can be combined in embodiments other than those described in the following.

BRIEF DESCRIPTION OF THE DRAWINGS

The above, as well as addition objects, features and advantages of the present invention, will be better understood through the following illustrative and non-limiting detailed description of embodiments of the present invention. Reference will be made to the appended drawings, on which.

All the figures are schematic and generally only show parts which are necessary in order to elucidate the invention, whereas other parts may be omitted or merely suggested.

DETAILED DESCRIPTION OF EMBODIMENTS

Figure 1:
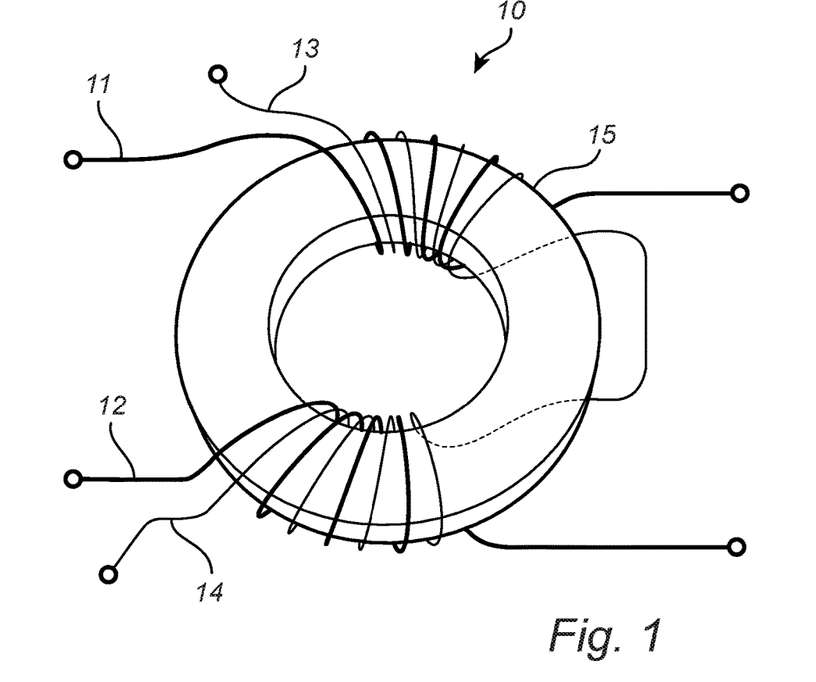
FIG. 1 shows a common mode inductor according to an embodiment of the present invention.

FIG. 1 shows a common mode inductor according to an embodiment. In this example, the common mode inductor 10 has a first winding 11 and a second winding 12 wound in opposite directions around a ring-shaped core 15. The arrangement of the windings may result in induced magnetic fields in the core 15, wherein common mode currents may induce cooperating magnetic fields and differential mode currents may induce opposing magnetic fields that counter-act each other. As a consequence, the common mode inductor may act as a high impedance primarily in relation to common mode currents while it has little or no significant effect on differential mode currents.

The common mode inductor 10 may further comprise a third winding 13 and a fourth winding 14, which together may form a sensor winding 13, 14. The third winding 13 may be wound parallel to, or along at least a portion of the first winding 11 such that current flowing in the first winding 11 may induce a current in the third winding 13. Similarly, the fourth winding 14 may be wound parallel to, or along at least a portion of the second winding 12 such that current flowing in the second winding 12 may induce a current in the fourth winding 14. The induced currents in the third winding 13 and fourth winding 14, respectively, may have the same direction as the currents flowing in the first winding 11 and second winding 12, respectively. Due to the series connection of the third winding 13 and the fourth winding 14, currents may therefore in the common mode be induced in opposite directions in the sensor winding 13, 14. The induced currents may hence suppress or even cancel out each other in the common mode, resulting in a relatively low or zero net current flowing in the sensor winding 13, 14. Correspondingly, currents may be induced in a same direction in the differential mode, resulting in an induced current in the third winding 13 cooperating with an induced current in the fourth winding 14. The induced currents may in the differential mode hence add up to a sensor signal that can be extracted from the sensor winding 13, 14 and be used as a measure of the differential signal flowing through the inductor 10.

Figure 2:
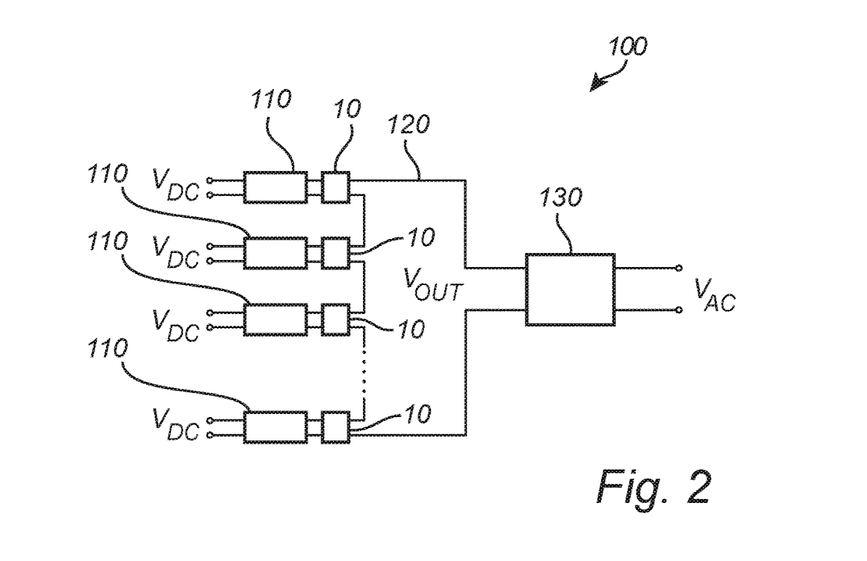
FIG. 2 graphically illustrates a power inverter system comprising common mode inductors according to an embodiment.

FIG. 2 shows a power inverter system 100 connected to a central unit 130 according to an embodiment. The power inverter system 100 may comprise a plurality of switching units, such as e.g. H-bridge converters 110, each being arranged to be supplied with an input DC power and voltage $V_{DC}$ from a respective source, such as e.g. a photovoltaic element (not shown in FIG. 1). The H-bridge converters 110 may be cascaded to produce a multilevel output voltage $V_{OUT}$, which may be fed via the common line 120 to the central unit 130. Each one of the switching units 110 may comprise a common mode inductor 10, which may be similarly configured as the embodiments discussed in connection with FIG. 1 and connected to the output side of the respective switching unit 110. During differential mode operation, a sensor signal may hence be extracted from the sensor winding 13, 14. The signal may e.g. correspond to a command signal from the central control unit 130. The measured differential signal may be transferred to a control circuitry, such as e.g. a microcontroller, adapted to control the corresponding switching unit based on the measured differential signal.

The central unit 130 may be adapted to output an AC $V_{AC}$ matching the grid AC, and to generate the command signal for controlling the operation of one or several of the switching units 110. The command signal may be generated by e.g. a switching unit at the central unit 130, wherein the switching unit may be adapted to operate in a communication mode wherein silent periods of the combined output AC $V_{OUT}$, i.e., periods where no inverter mode switching occurs, are utilized for generating the command signal. The command signal may be superimposed on the combined output AC $V_{OUT}$ and transmitted via the common line 120 to the power inverter system 100, where it may be measured by the common mode inductor 10 and utilized for controlling the operation of the switching units 110.

In case of the input voltage sources being photovoltaic panels, each H-bridge converter 110 and common mode inductor 10 may be integrated in e.g. a junction box of the respective panel.

Figure 3:
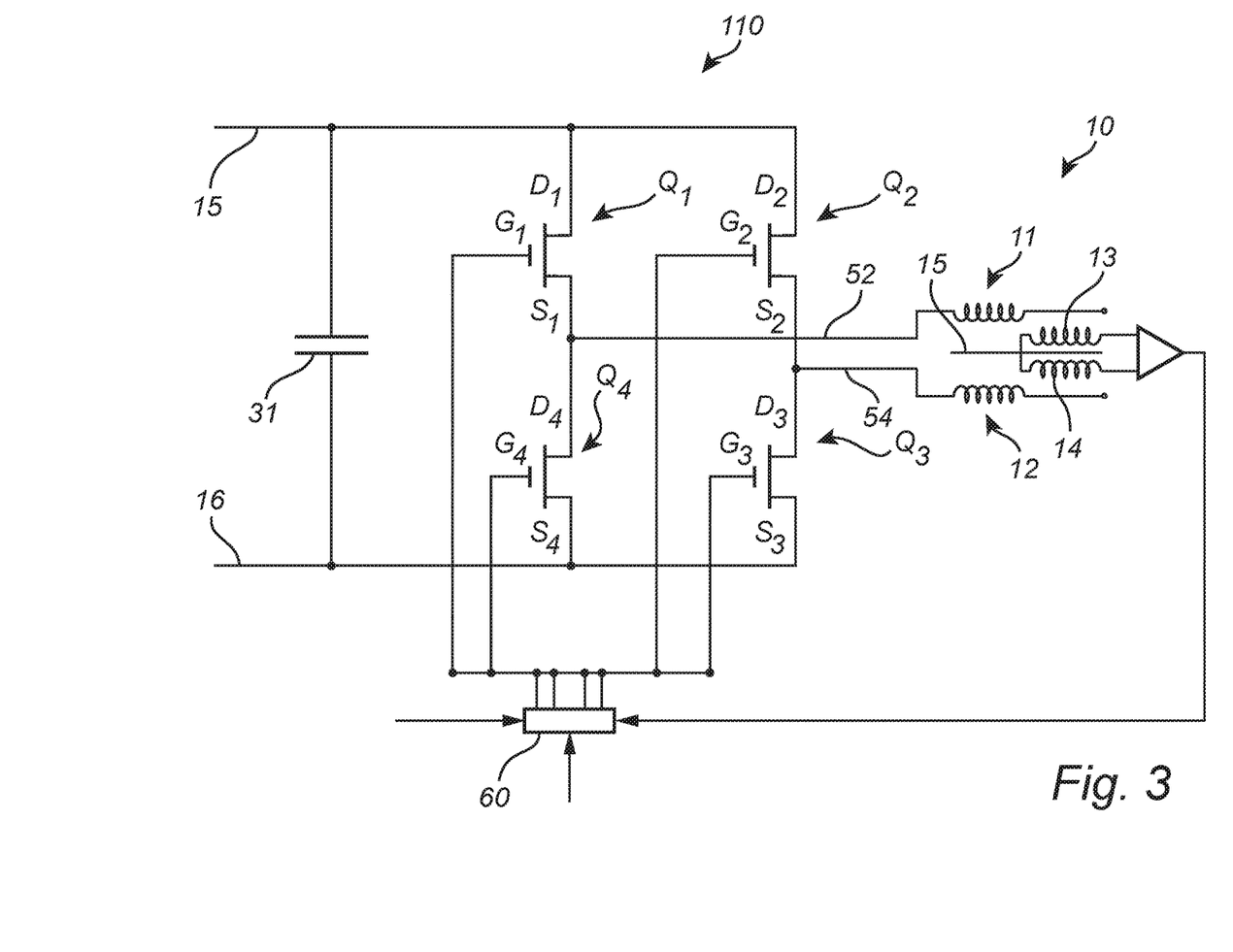
FIG. 3 shows a switching unit according to an embodiment.

FIG. 3 shows an exemplifying embodiment of a common mode inductor 10 and a switching unit 110 similarly configured as the embodiments discussed with reference to FIGS. 1 and 2. More specifically, a circuit diagram of a common mode inductor 10 coupled to the output terminals of an H-bridge converter 21, comprising four switches Q1, Q2, Q3, Q4 in the form of four metal oxide semiconductor filed effect transistors (MOSFETs) Q1, Q2, Q3, Q4, is shown. However, any other appropriate switching element may be used with the common mode inductor 10, such as insulated gate bipolar transistors (IGBTs), or bipolar junction transistors (BJTs).

The common mode inductor 10 may be connected to the output terminals 52, 54 of the switching unit 110 so as to suppress common mode noise, an in particular noise having a relatively high frequency as compared with the frequency of the output AC signal. As indicated in FIG. 3, the first winding 11 of the common mode inductor 10 may be connected to a first output terminal 52 of the switching unit 110 and the second winding 12 to the second output terminal 54 of the switching unit 110. The differential signal may be measured as an induced current in the third 13 and fourth 14 winding.

The drain D1 of the first transistor Q1 and the drain D2 of the second transistor Q2 may be electrically connected to a positive pole 15 of an input DC power source, such as e.g. photovoltaic panel (not shown), while the sources S1 and S2 of the respective first and second transistors Q1 and Q2 may be electrically connected to the drains D4 and D3 of the fourth and third transistors Q4, Q3, respectively. The sources S3 and S4 of the third and fourth transistors Q4, Q3 may be electrically connected to a negative pole 43 of the input DC power source. The source S1 of the first transistor Q1 may be electrically connected to the drain D4 of the fourth transistor Q4 at a first output terminal 52, whereas the source S2 of the second transistor Q2 may be electrically connected to the drain D3 of the third transistor Q3 at a second output terminal 54. The first and second output terminals 52, 54 may be connected to the common line of a power inverter system (not shown in FIG. 3).

The gate terminals G1, G2, G3, G4 of the four transistors Q1, Q2, Q3, Q4 may be electrically connected to a switch control circuitry or microcontroller 60 or adapted to control the MOSFETs Q1, Q2, Q3, Q4 by supplying a gate voltage to their respective gates G1, G2, G3, G4. The switch control circuitry or microcontroller 60 may e.g. be mounted on a printed circuit board (not shown) along with the switching unit 110. The micro-controller 60 may also be connected to the common mode inductor 10, providing the microcontroller with information being transmitted on the common line.

The microcontroller 60 may be adapted to operate the switching units 110 in the inverter mode in such manner that the combined output from a plurality of switching units 110 of the power inverter system 100 produces a combined multilevel AC matching the required AC. Further, the microcontroller 60 may operate the switching unit 110 in the communication mode, wherein the switching unit 110, in a silent period between two consecutive switching events of any of the plurality of switching units 110, may produce a communication signal. This may be achieved by means of the micro-controller 60, which may operate the switching units Q1, Q2, Q3, Q4 so as to generate output forming the desired communication signal. The microcontroller 60 may be configured to receive the command signal from the central unit by means of the sensor winding 13, 14 of the common mode inductor 10 and operate the switching unit 110 accordingly in the inverter mode.

Figure 4:
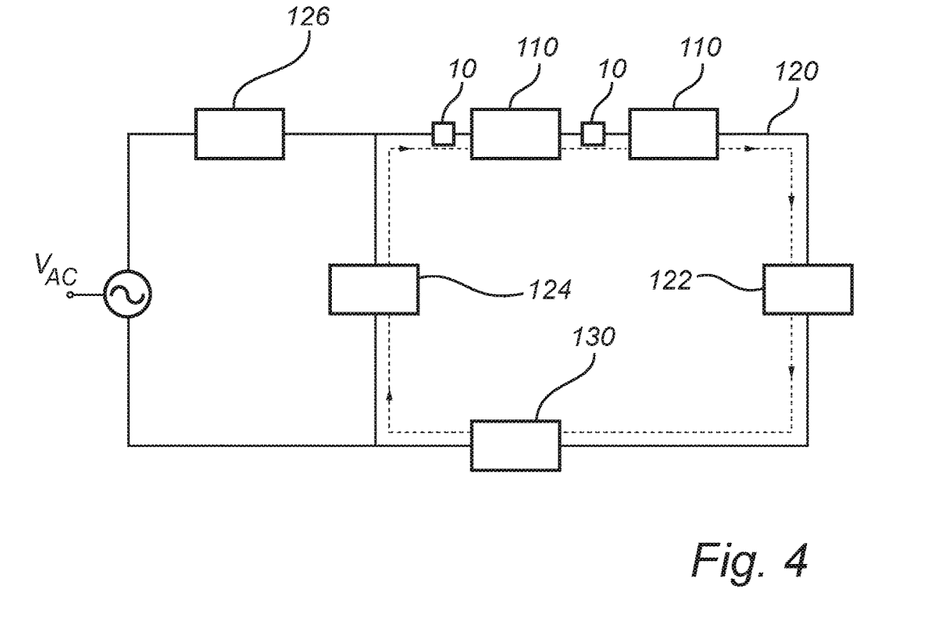
FIG. 4 schematically illustrates the layout of a system and its associated signalling paths according to an embodiment.

FIG. 4 shows a power inverter system and a central unit similarly configured as the embodiments discussed with reference to FIGS. 1 to 3. The power inverter system 100 may comprise a plurality of cascaded switching units 110 that are connected to a central unit 130 that may be adapted to receive the communication signal generated by the power inverter system 100 and to transmit a command signal controlling operation of the power inverter system 100. Further, each one of the switching units 110 may be connected to a common mode inductor 10 for measuring a differential signal in the common line 120. As indicated in FIG. 4, there might also be provided further components, such as e.g. a terminator 122 for reducing reflections of the communication signal in the common line 120. Further components may be e.g. a filter 126 for filtering the output AC $V_{AC}$ before it is output to e.g. the grid, and a filter 124 for filtering e.g. the command signal. The filters 124, 126 may e.g. be structurally incorporated with the central unit 130.

In FIG. 4 the communication signal and the command signal are represented by a dashed line, wherein arrows are provided to schematically indicate the path of the signals during operation of the power inverter system 100 and central unit 130. As indicated, the communication signal and the command signal circulates from the switching units 110 of the power inverter system 100, via the common line 120 to the central unit 130, from which the command signal (which may be based in the communication signal) is output/returned to the common mode inductors 10 of the switching units 110. The combined output AC $V_{OUT}$ may be transmitted in the same common line 120 as the communication signal and/or the command signal, but may be further transmitted as an output AC $V_{AC}$ to e.g. the grid.

Figure 5:
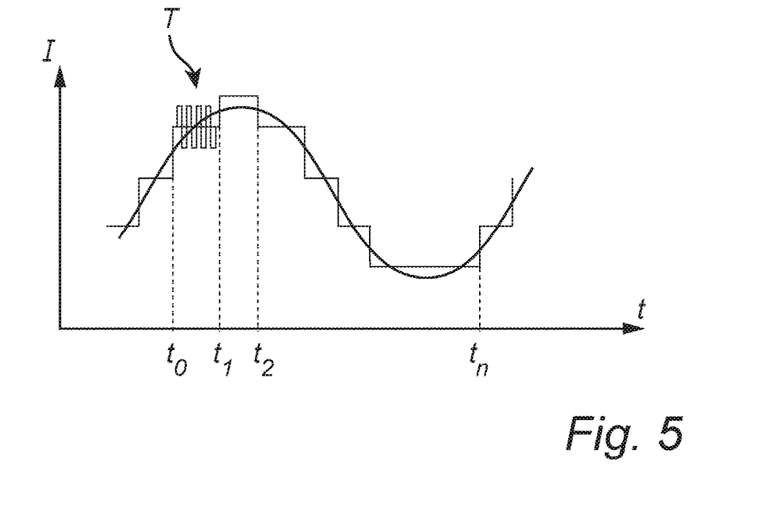
FIG. 5 is a diagram illustrating the combined multilevel output voltage waveform from a system according to an embodiment.

FIG. 5 is a diagram illustrating a combined multilevel output AC $V_{OUT}$ from a power inverter system that may be similarly configured as the embodiments described with reference to any one of FIGS. 1 to 4. In the diagram, the combined output AC $V_{OUT}$ is indicated as a current I (vertical axis) as a function of time t (horizontal axis). In the present, illustrative example 12 cascaded switching units are used to generate a combined multilevel output AC $V_{OUT}$ matching a desired sinusoidal AC $V_{AC}$. The switching events of the switching units are indicated by $t_0, t_1, \ldots, t_n$ on the horizontal axis and may correspond to switching commands of the command signal, causing the switching units to switch between different output levels. The silent periods that can be used for signaling are schematically represented by the flat steps between two consecutive switching commands or switching events $t_n$, $t_{n+1}$. In the present figure, the communication signal is generated during silent period T between switching events $t_0$ and $t_1$. The signal may e.g. be generated by operating one of the switching units in the communication mode during that period, i.e., by switching the switching unit a plurality of times between $t_0$ and $t_1$, and/or by switching a switching unit of the central unit in a similar manner. The communication signal and/or command signal may hence be superimposed on the combined multilevel AC.

It will also be appreciated that the common mode inductor as discussed with reference to any one of the above embodiments may be used in a method for measuring a differential communication signal as previously described. According to the method, a differential communication signal may be transmitted through the first winding and the second winding, and a differential communication signal measured based on a sensor signal induced in the third and fourth winding. Such a method may be embodied as computer-executable instructions distributed and used in the form of a computer-program product including a computer readable medium storing such instructions. By way of example, computer-readable media may comprise computer storage media and communication media. As is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Further, it is known to the skilled person that communication media typically embodies computer readable instructions, data structures, program modules or other data in a modulated data signal such as a carrier wave or other transport mechanism and includes any information delivery media.

The invention claimed is:

1. A common mode inductor for suppression of common mode noise and transmission of a differential mode signal, comprising:
   a core with a first winding and a second winding, the first winding and the second winding forming a differential pair of conductors arranged to convey a differential communication signal;
   a third winding extending along, and being inductively coupled to, at least a portion of the first winding; and
   a fourth winding extending along, and being inductively coupled to, at least a portion of the second winding,
   wherein the third winding and the fourth winding are connected in series with each other and adapted to provide a sensor signal induced by the differential communication signal in the first winding and the second winding.

2. The common mode inductor according to claim 1, wherein the core is a ferromagnetic, ring-shaped, C-shaped or E-shaped core.

3. The common mode inductor according to claim 1, wherein the first winding and the second winding are adapted to convey a differential output AC from a switching unit connected to an input DC power source.

4. The common mode inductor according to claim 3, wherein the differential communication signal is generated by a central unit.

5. A system comprising
   a switching unit adapted to receive an input DC power and output an output AC power; and
   a common mode inductor connected to switching unit and adapted to convey the output AC as a differential output AC,
   the common mode inductor including:
      a core with a first winding and a second winding, the first winding and the second winding forming a differential pair of conductors arranged to convey a differential communication signal;
      a third winding extending along, and being inductively coupled to, at least a portion of the first winding; and
      a fourth winding extending along, and being inductively coupled to, at least a portion of the second winding,
      wherein the third winding and the fourth winding are connected in series with each other and adapted to provide a sensor signal induced by the differential communication signal in the first winding and the second winding.

6. The system according to claim 5, wherein the differential communication signal comprises information for controlling the operation of the switching unit.

7. The system according to claim 5, comprising a plurality of switching units interconnected to produce a combined output AC.

8. The system according to claim 7, further comprising a common line adapted to transmit the combined output AC.

9. The system according to claim 8, wherein the common line is adapted to transmit the differential communication signal.

10. The system according to claim 5, wherein the input DC power is generated from a photovoltaic panel.

11. The system according to claim 5, wherein the plurality of switching units are arranged in cascade configuration.

12. The system according to claim 5, wherein the plurality of switching units are H-bridge converters.

13. A method for measuring a differential communication signal in a common mode inductor comprising:
- a core with a first winding and a second winding, the first winding and the second winding forming a differential pair of conductors arranged to convey the differential signal,
- a third winding extending along, and being inductively coupled to, at least a portion of the first winding;
- a fourth winding extending along, and being inductively coupled to, at least a portion of the second winding, the third winding and the fourth winding are connected in series with each other;

the method, comprising:
- transmitting a differential communication signal through the first winding and the second winding; and
- measuring the differential communication signal based on a sensor signal induced in the third and fourth winding.

14. The method according to claim 13, wherein the core is a ferromagnetic, ring-shaped, C-shaped or E-shaped core.

15. The method according to claim 13, wherein the first winding and the second winding are adapted to convey a differential output AC from a switching unit connected to an input DC power source.

16. The method according to claim 15, wherein the differential communication signal is generated by a central unit.

* * * * *